United States Patent [19]

Prasad et al.

[11] Patent Number: 5,130,362

[45] Date of Patent: Jul. 14, 1992

[54] THIRD ORDER NON-LINEAR OPTICALLY ACTIVE COMPOSITES, METHOD OF MAKING SAME AND PHOTONIC MEDIA COMPRISING SAME

[75] Inventors: Paras N. Prasad, Williamsville, N.Y.; Frank E. Karasz, Amherst, Mass.; Yang Pang; Chichang J. Wung, both of Buffalo, N.Y.

[73] Assignee: The Research Foundation of State Univ. of N.Y., Albany, N.Y.

[21] Appl. No.: 803,667

[22] Filed: Dec. 3, 1991

Related U.S. Application Data

[63] Continuation of Ser. No. 312,132, Feb. 17, 1989, abandoned.

[51] Int. Cl.$^5$ ................................................ C08K 5/24
[52] U.S. Cl. .................................. 524/265; 524/609
[58] Field of Search ............................... 524/265, 609

[56] References Cited

U.S. PATENT DOCUMENTS

4,765,818  8/1988  Che et al. ............................ 65/18.1

*Primary Examiner*—Joseph L. Schofer
*Assistant Examiner*—Peter Mulcahy

[57] ABSTRACT

A composite having third order non-linear optical activity comprising, an organic polymer and an inorganic material. The organic polymer has third order nonlinear optical activity and the inorganic material is a sol-gel glass. The organic polymer or a precursor of the organic polymer is mutually soluble with a precursor of the sol-gel glass. The invention also includes photonic media having the above composite and a method of making the composite.

18 Claims, No Drawings

THIRD ORDER NON-LINEAR OPTICALLY ACTIVE COMPOSITES, METHOD OF MAKING SAME AND PHOTONIC MEDIA COMPRISING SAME

This invention was made with Government support under AFOSR Contracts F 49620-87-C-0042 and F 49620-87-C-0097 awarded by the Air Force. The Government has certain rights in this invention.

This is a continuation of copending application(s) Ser. No. 07/312,132 filed on Feb. 17, 1989, now abandoned.

BACKGROUND OF THE INVENTION

Photonics is an emerging technology viewed by many as the future direction of optical signal processing and ultrafast optical computing. Photonics is generally a technology where photons rather than electrons are used to carry informational signals.

Nonlinear optical effects of photonic media play an important role in photonics. Nonlinear optics refers to the nonlinear relationship between the response of the material and the intensity of infinite light. An important manifestation of the effect of nonlinear optics is the dependence of the refractive index on the intensity of light. Nonlinear optical effects are important in photonics because they provide means to produce optical switching (optically induced switching of a device from a low optical transmission state to a high optical transmission state) and optical bistability (behavior of a device whereby the device exhibits two optical absorptions within a given range of input values). Optical switching and optical bistability are functions needed for optical logic and optical memory operation.

Conjugated organic polymers are considered an important class of optical material because they have demonstrated large, non-resonant (non-absorptive), optical nonlinearity with ultra fast response time in the sub-pico seconds regime, ("Nonlinear Optical and Electroactive Polymers" Edr's, P. N. Prasad and D. R. Ulrich, Plenum Press, N.Y. 1988). These polymers in their pure state, however, have generally not been found to form good photonic media because they typically exhibit high optical losses. For example, optical film made of pure poly-p-phenylene vinylene, a conjugated organic polymer, exhibits refractive index inhomogeneities (i.e. the refractive index varies from domain to domain) and degraded optical quality.

Many glasses, including silica glass, are also considered an important class of optical material in that they form excellent photonic media because of extremely low optical losses. A major problem with many glasses is that their optical nonlinear coefficient (the quantitative representation of the strength of the nonlinear optical effects; $X^{(3)}$ — third order nonlinear coefficient) is extremely low. Optical switching in silica wave guides (devices which channel optical waves formed in silica) has been observed; however, long interaction lengths are necessary to compensate for the extremely low optical nonlinearity.

Therefore, currently there exists a need for a material having high, nonlinear optical coefficients, high optical quality (scattering and absorption losses within the material is small).

Accordingly, an overall object of the invention is to provide a nonlinear, high optical quality material.

A more particular object of this invention to provide a composite material capable of being formed into non-linear, high optical quality wave guides with low optical losses.

A further object of the invention is to provide a material which exhibits good mechanical strength, and possess environmental and thermal stability.

Still another object is to provide a material having the above qualities, which can be incorporated into integrated optical device structures, in the form of optical fibers and optical wave guides with high optical through-puts; and into channel wave guides (structures having a plurality of channels that propagate light).

Another object of the invention is to provide a method of making the composite material, having the above qualities, which will provide enhanced protection for the active element in the environment.

SUMMARY OF THE INVENTION

The invention is a composite having third order nonlinear optical activity comprising, an organic polymer and an inorganic material, said organic polymer having third order non-linear optical activity and said inorganic material being a sol-gel glass; wherein said organic polymer or a precursor of said organic polymer is mutually soluble with a precursor of the sol-gel glass.

The invention further comprises photonic media comprising the above composite and a method of making said composite.

The method of making a third order nonlinear optically active composite comprises the steps of a) mixing a precursor of a sol-gel glass, a solvated precursor of an organic polymer having third order nonlinear optical activity and a mutual solvent with a sufficient amount of drying control chemical additive, to form a sol; b) adding a predetermined amount of additional solvent and solvated organic polymer precursor; c) maintaining the mixture at about ambient temperature for a sufficient time until just prior to gel formation; d) forming a desired structure; and e) heat treating to consolidate the sol-gel and convert the organic polymer precursor to the desired organic polymer.

DETAILED DESCRIPTION OF THE INVENTION

Third order non-linear optical activity as used herein refers to physical properties, one of whose manifestations is an intensity dependent refractive index of a material.

By high optical quality is meant materials having optical attenuation of less than about 10 dB/cm for a light of wavelength of 1.06$\mu$.

Organic polymers having third order, non-linear optical activity, are suitable for the organic polymers, in accordance with this invention. Typically these polymers are conjugated polymer systems. Preferred members of conjugated polymer systems include those which can be synthesized via a sulfonium salt precursor route. Examples of such conjugated systems are described in U.S. Pat. Nos. 3,401,152 and 3,706,677. Poly-p-phenylene vinylene (PPV), homopolymeric and copolymeric derivatives of PPV and heteroatomic analogs of PPV and their copolymers with PPV or derivatives of PPV, are the most preferred organic polymers having third order, non-linear optical activity. An example of a homopolymeric derivative would be 2,5 - dimethoxy derivatives. An example of a heteroatomic analog of the PPV is poly-thienylene vinylene.

By organic polymer precursor is meant a precursor to the organic polymers having the above properties, which may be converted by chemical and/or thermal treatment into the desired organic polymer of the composite. The organic polymer precursor is itself an organic polymer.

There are water-woluble sulfonium polyelectrolyte polymers which are precursors of PPV. The PPV is then formed by a thermal elimination reaction of the precursor. Other polymers and their polymeric precursors are described in "High Molecular Weight Polyphenylene Vinylene", F. E. Karasz, J. D. Capistran, D. R. Gagnon and R. W. Lenz, Mol. Cryst. Liq. Cryst. 118, 327-332 (1985), and in "Preparation of Poly (phenylene vinylene) from cycloalkylene sulfonium Salt Monomers and Polymers" Robert W. Lenz, Chien-Chung Han, John Stenger-Smith and F. E. Karasz, Journal of Polymer Science: Part A: Polymer Chemistry, Vol. 26, 3241-3248 (1988).

The inorganic material is a sol-gel derived glass substance. By sol-gel glass is meant a glass formed by a sol-gel processing technique. Suitable sol-gel processed glasses include but are not limited to the Group IV oxide glasses. A preferred sol-gel glass is silica sol-gel glass.

By sol-gel precursor is meant a low molecular weight (nonpolymeric, for example a monomer) soluble, inorganic material which can react to form ultimately a three dimensional cross-linked polymeric material. The sol-gel precursor is used to form, by the sol-gel processing technique, the sol-gel processed glass. Examples of suitable sol-gel precursors which may be used in accordance with this invention are Group IV tetraalkoxy compounds which can be processed by the sol-gel method to yield a Group IV oxide glass. An example of a preferred sol-gel precursor is tetramethyl orthosilicate, (TMOS, also known as silicon tetramethoxide), which is commercially available. TMOS is the precursor for the preferred silica sol-gel glass.

The sol-gel processing technique is well known to those skilled in the art and can generally be described as a three step process whereby a multivalent inorganic alkoxide is used as a precursor to produce an inorganic glass. In the first step, the solvated precursor is hydrolyzed by addition of water, undergoes partial reaction and thereby forms very small colloidal particles dispersed in the solution. This dispersion is called a sol. As the reaction proceeds, a three dimensional polymeric network (gel) is formed. In the final step, the gel is heated to consolidate the material by reducing the void content and expelling the solvent and the volatile, low molecular weight reaction product, to produce a glass. A more detailed description of the sol-gel processing technique may be found in "SiO2 gel Glasses"L. L. Hench, S. H. Wang, and S. C. Park, SPIE Proceedings of the Symposium on "Advances in Optical Materials" Vol. 505, p. 90 (1984).

Mutually soluble as used herein means that the organic polymer or a precursor of the organic polymer is soluble in the same solvent with the precursor of the sol-gel processed glass. Typically any solvent which will mutually solubilize the components can be used. Suitable solvents include water and alcohols. Preferred solvents are water, methanol and ethanol.

The composites of the present invention may be formed by mixing a solvent, a sol-gel precursor and a solvated organic polymer precursor with a sufficient amount of drying control chemical additive, to form a sol.

Additional solvent and solvated organic polymer precursor, may be added to dilute the sol dispersion, to slow down the gelation process and produce better quality composite films, (predetermined amount). Such a mixture may be maintained at an appropriate temperature until just prior to incipient gel formation. Films may then be cast, the sol-gel can be consolidated and the organic polymer precursor may be converted into the desired organic polymer.

The solvated organic polymer precursor may be an organic polymer precursor in a solvent. An example of a preferred solvated organic polymer precursor is an organic polymer precursor in about a 3% to about 5% aqueous solution. Most preferably the solvated organic polymer precursor is a 4% aqueous solution.

Examples of drying control chemical additives include formic acid, formamide, glycerol and oxalic acid. A detailed discussion of these drying control chemical additives is found in The Science of Ceramic Chemical Processing, eds Larry L. Hench and Donald R. Ulrich, Wiley Interscience Publishing Co., 1986, pp.52-64. For example, formic acid may be utilized in an amount equivalent to between about 0.1% to about 1% of the weight of the sol-gel precursor.

Films may be cast on a suitable substrate using methods known to those skilled in the art. Examples of suitable methods include but are not limited to Spin Coating and Doctor Blading.

The Spin Coating method produces sub-micrometer thick films. The Doctor Blading method may be preferred when films of between 1-3μm in thickness are needed. Films made by these known techniques are kept at ambient temperature in a dark and clean environment for a sufficient time to allow some of the solvent and the volatiles to slowly evaporate. Generally, about 3-5 hours is sufficient for the solvent to evaporate.

The PPV precursor is converted into PPV and the sol is consolidated by heat treating the materials or by other methods known to those skilled in the art. More specifically, the product may be placed in an oven for heat treatment, preferably a vacuum oven. The sol may be consolidated by placing the film into a vacuum oven at between about 60 to 80° C. for about 3 to 8 hours; then at about 100 to 130° C. for about 10 to 15 hours, to age the sol-gel, maintain the sol-gel quality and limit cracking. Then the organic polymer precursor is converted into the desired organic polymer by heat treating in the vacuum oven at about 200 to 280° C. for about 10 hours.

This method produces composites of high optical quality. The composites of the invention retain the third order non-linear optical activity of the organic polymer and exhibit high optical quality. These materials may then be utilized to form photonic media of high optical quality, with nonlinear properties. Examples of photonic media include optical fibers, optical wave guides and channel wave guides having high optical throughputs.

The following examples and preparations describe the manner and process of making and using the invention and set forth the best mode contemplated by the inventor of carrying out the invention, but are not to be construed as a limitation thereof.

EXAMPLES

To form a composite in accordance with this invention which comprises PPV and silica sol-gel, equal volumes of TMOS, about 4% aqueous solution of PPV precursor (filtered) and methanol were mixed with an amount of formic acid, equivalent to about 1% of TMOS by weight. The above components were mixed with constant agitation at about 60° C. for about 30 minutes until a sol was formed.

At about 24-27° C. (ambient temperature) about 8 additional volumes of methanol and a sufficient amount of aqueous PPV precursor solution was added to the above mixture until one of the preferred ratios below was reached.

Examples of preferred ratios of PPV and TMOS (by weight) are:

| # | PPV precursor | TMOS |
|---|---|---|
| 1 | 1 | 1 |
| 2 | 1 | 1.5 |
| 3 | 1 | 2 |
| 4 | 1 | 4 |
| 5 | 1 | 6 |

The mixture was placed in an ultrasonic bath to clarify the solution. The solution was then kept at about ambient temperature until the gel was about to form. Generally, the more TMOS in the mixture, the shorter the time required for gelation to begin. For the preferred ratios of 1:1 to 1:2 of PPV precursor to TMOS, about 8 hours was required.

Although any of the known methods may be utilized, the films were cast using the Spin Coating method. The sol-gel was consolidated and the PPV precursor was converted into PPV by placing the films into a vacuum oven at about 70° C. for about 4 hours, then at 120° C. for about 10 hours, and finally 200° C. for about 10 hours.

Other embodiments of the invention will be apparent to the skilled in the art from a consideration of this specification or practice of the invention disclosed herein. It should be understood that there may be other embodiments which fall within the spirit and scope of the invention as defined by the following claims.

What is claimed is:

1. A composite having third order non-linear optical activity comprising an organic polymer and an inorganic material, said organic polymer having third order non-linear optical activity, said composite comprising a consolidated sol gel glass containing said organic polymer dispersed in sol gel, wherein the organic polymer is dissolved in the sol gel.

2. The composite as recited in claim 1 wherein the organic polymer is a conjugated polymer.

3. The composite as recited in claim 2 wherein the conjugated polymer is synthesized by a sulfonium salt precursor route.

4. The composite as recited in claim 3 wherein the organic polymer is a poly-p-phenylene vinylene.

5. The composite as recited in claim 1 wherein the organic polymer is a homopolymeric derivative of poly-p-phenylene vinylene.

6. The composite as recited in claim 1 wherein the organic polymer is a copolymeric derivative of poly-p-phenylene vinylene.

7. The composite as recited in claim 1 wherein the organic polymer is a heteroatomic analog of poly-p-phenylene vinylene.

8. The composite as recited in claim 1 wherein the sol-gel is a Group IV oxide glass.

9. The composite as recited in claim 3 wherein the sol-gel is a Group IV oxide glass.

10. The composite as recited in claim 8 wherein the sol-gel is silica sol-gel.

11. The composite as recited in claim 9 wherein the sol-gel is silica sol-gel.

12. The composite as recited in claim 1 wherein the solvent may be selected from the group consisting of water and alcohol.

13. The composite as recited in claim 11 wherein the solvent may be selected from the group consisting of water and alcohol.

14. The composite as recited in claim 11 wherein the solvent is water.

15. The composite as recited in claim 13 wherein the solvent is water.

16. The composite as recited in claim 12 wherein the solvent is alcohol.

17. The composite as recited in claim 16 wherein the solvent is methanol.

18. The composite as recited in claim 16 wherein the solvent is ethanol.

* * * * *